(12) United States Patent
Goebel et al.

(10) Patent No.: US 6,218,980 B1
(45) Date of Patent: Apr. 17, 2001

(54) TERRAIN CORRELATION SYSTEM

(75) Inventors: Robert H. Goebel, Bridgeton; Dale A. Fogle, St. Louis County; David C. Torretta, Ladue; Philip Panagos, Bellefontaine Neighbors; Patrick A. Heffern, St. Louis County, all of MO (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 07/047,540

(22) Filed: May 5, 1987

Related U.S. Application Data

(63) Continuation of application No. 06/417,482, filed on Sep. 13, 1982, now abandoned.

(51) Int. Cl.[7] .................................................. G01S 13/00
(52) U.S. Cl. ................................................................ 342/64
(58) Field of Search .............................. 342/64; 364/453, 364/456, 457

(56) References Cited

U.S. PATENT DOCUMENTS

| | | | |
|---|---|---|---|
| 4,144,571 | * 3/1979 | Webber | 342/64 |
| 4,175,285 | * 11/1979 | Dansac et al. | 342/64 |
| 4,179,693 | * 12/1979 | Evans et al. | 343/5 MM |
| 4,347,511 | * 8/1982 | Hofmann et al. | 342/64 |
| 4,514,733 | * 4/1985 | Schmidtlein et al. | 364/456 X |
| 4,700,307 | * 10/1987 | Mons et al. | 342/64 X |

* cited by examiner

Primary Examiner—Mark Hellner
(74) Attorney, Agent, or Firm—Polster, Lieder, Woodruff & Lucchesi, L.C.

(57) ABSTRACT

A terrain correlation system for use in conjunction with an inertial navigation system of a vehicle is provided which can update position information and which is both independent of altitude and compatible with varying course paths. In the preferred embodiment, reference terrain altitude maps are converted to reference map transformation values. The reference map transformation values are used in conjunction with a terrain correlation process to establish vehicle position. The system also is able to select reference map scenes to the left, right, front or rear of present vehicle position so that curved travel paths can be updated in a manner similar to more conventional straight line vehicle paths.

14 Claims, 4 Drawing Sheets

TERRAIN CORRELATION SYSTEM

This is a continuation application of application Ser. No. 417,482, filed on Sep. 13, 1982 now abaondoned.

BACKGROUND OF THE INVENTION

This invention relates to terrain correlation systems, and in particular, to a terrain correlation system for use in inertial navigation systems. While the invention is described with particular reference to its application in missile control applications, those skilled in the art will recognize the wider applicability of the inventive principles disclosed hereinafter.

As appreciated by those skilled in the art, inertial navigation systems require periodic position updates in order to compensate for drift errors introduced during vehicle travel. There are a number of schemes available for updating inertial navigation system position. However, a number of these systems will not function well at all altitudes. Terrain correlation is one method that is adaptable for work at a number of altitudes.

Terrain correlation uses a reference map of terrain height variations to locate the vehicle position in a local earth reference coordinate system. Terrain correlation takes advantage of the natural variations in the elevation of the earth's surface to provide a unique signature for position correction. These variations are the only available signature that can be measured accurately on an absolute scale, both with a sensor and from reference maps produced from a stereographic data base. Terrain contours are relatively invariant with changes in season, weather and time of day, as compared to other measurable signatures, also known in the art. Terrain contours also are measurable with relatively simple techniques that are not overly sensitive to altitude and attitude errors, reducing the total impact of environmental effects on the system. Since position location is made relative to a localized coordinate system, errors associated with transformations between coordinate systems are removed. Since the accuracy of the position is so good and an extremely low probability of a catastrophic false fix is present, terrain correlation also can be used for arming and fusing functions of a missile weapon delivery system, for example.

Terrain correlation is employed to remove the vehicle position errors created by inertial navigation system drift. Prior to implementation of terrain correlation, the vehicle likely is within a known region defined in the art and for the purpose of this specification as an uncertainty basket. In one illustrative implementation, terrain correlation uses a radar altimeter, for example, as the basis for accurately locating the vehicle within the uncertainty basket. The position fix is accomplished by performing a one-dimensional (line) correlation between a set of measured altitudes and a stored reference map of terrain height variations. Several algorithms are available for comparing the measured to the stored altitudes. The one employed in the embodiment described hereinafter is the mean absolute difference with means removed. A geometric presentation of this correlation process is shown in FIG. 1 of the drawings. A reference map of terrain altitudes is obtained from available source data and stored in computer memory. A second map is a set of contiguous measured altitudes. The length of the shorter of the two maps must be equal to the length over which correlation is being attempted. This is called the integration length of the processes and equal to the number of cells (N) times the width of a cell (D). The longer map must be equal to the sum of the length of the uncertainty basket plus the integration length. The width of the reference map is set equal to the width of the uncertainty basket. The mean absolute difference basically provides a measure of the match between the measured samples and the stored references and reaches a minimum value for the best match. The mean values are removed from both sets of data so that only incremental altitudes are compared. Each set of N adjacent measured samples is compared with each set of reference samples and the best match indicates the actual vehicle location.

The comparison is made by subtracting a measured altitude from a reference altitude for each of N consecutive samples parallel to the flight path, determining the absolute value of each difference, and adding the N consecutive absolute values. The result provides one point in the mean absolute difference matrix. The same N measured altitudes are compared with each row of N reference altitudes parallel to the flight path. This provides one cross-track column in the mean absolute difference matrix. The first measured altitude is removed, a new measured sample is added and the new set of N consecutive samples is compared with each reference row. This is accomplished in real time as the vehicle flies from cell to cell. This process is repeated until the down-track uncertainty basket has been examined, providing a two-dimensional mean absolute difference matrix over the entire uncertainty basket.

In the event that there is a perfect match, each difference is zero and the sum of N samples is zero, so the value of the mean absolute difference at that point is zero. Because of the various sources of error, a perfect zero is never obtained, but the minimum of the mean absolute difference matrix provides an accurate indication of the location of the vehicle. A pictorial description of the process is shown in FIG. 2.

While terrain correlation works well for its intended purposes, two known deficiencies with such systems previously have existed. Terrain correlation has not worked well at high altitudes. When a radar altimeter, for example, operates under such circumstances, the resulting measured terrain profile becomes a filtered or smooth version of the actual terrain profile. Consequently, terrain correlation use heretofore has been restricted to relatively low altitudes. The invention disclosed hereinafter solves the problem of high altitude implementation by employing a transformation of the reference terrain altitude maps. The transformation essentially is a simulation of the radar, antenna, terrain background scatter function and altimeter processing to give simulated values of the reference map based on the height of the vehicle. An alternate solution to this problem is the use of a laser sensor with its inherent narrow beamwidth, which reduces the smoothing problem.

A second known deficiency with prior art terrain correlation systems has been the system's dependency on a straight line vehicle path. The invention disclosed hereinafter is designed so that it can maintain cross-track position of the vehicle and provide the required correlation in a satisfactory time frame.

One of the objects of this invention is to provide a terrain correlation system which can be operated independently of altitude of the vehicle in which it finds application.

Another object of this invention is to provide a terrain correlation system which can establish the position of a vehicle in earth reference coordinates for a curvilinear flight path.

Another object of this invention is to provide a terrain correlation system which establishes vehicle position quickly.

Another object of this invention is to provide a terrain correlation system which is compatible with existing inertial navigation systems.

Another object of this invention is to provide a terrain correlation system which is compatible with existing avionic systems for missile controls.

Other objects of this invention will be apparent to those skilled in the art in light of the following description and accompanying drawings.

SUMMARY OF THE INVENTION

In accordance with this invention, generally stated, a navigation system for a vehicle is provided with terrain correlation embodied in a construction which is independent of vehicle altitude and which permits curvilinear vehicle course paths. In the preferred embodiment, the vehicle is a missile having an inertial navigation system. Reference terrain altitude maps are converted by a reference map transformation to data which correlates the reference map to the altitude of the missile. The system is designed to permit cross-track correlations of the reference map data so that the missile can be guided along various, nonlinear flight paths.

DESCRIPTION OF THE PREFERRED EMBODIMENT

Figure 1:
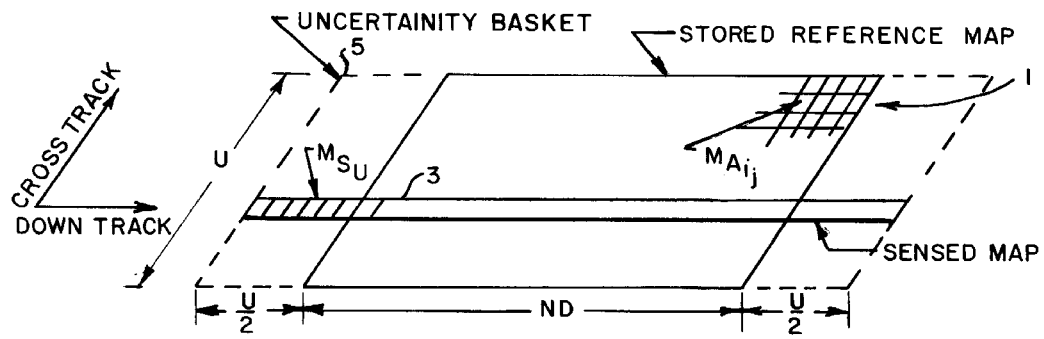
FIG. 1 is a geometric representation of the correlation process employed in the present invention.
Figure 5:
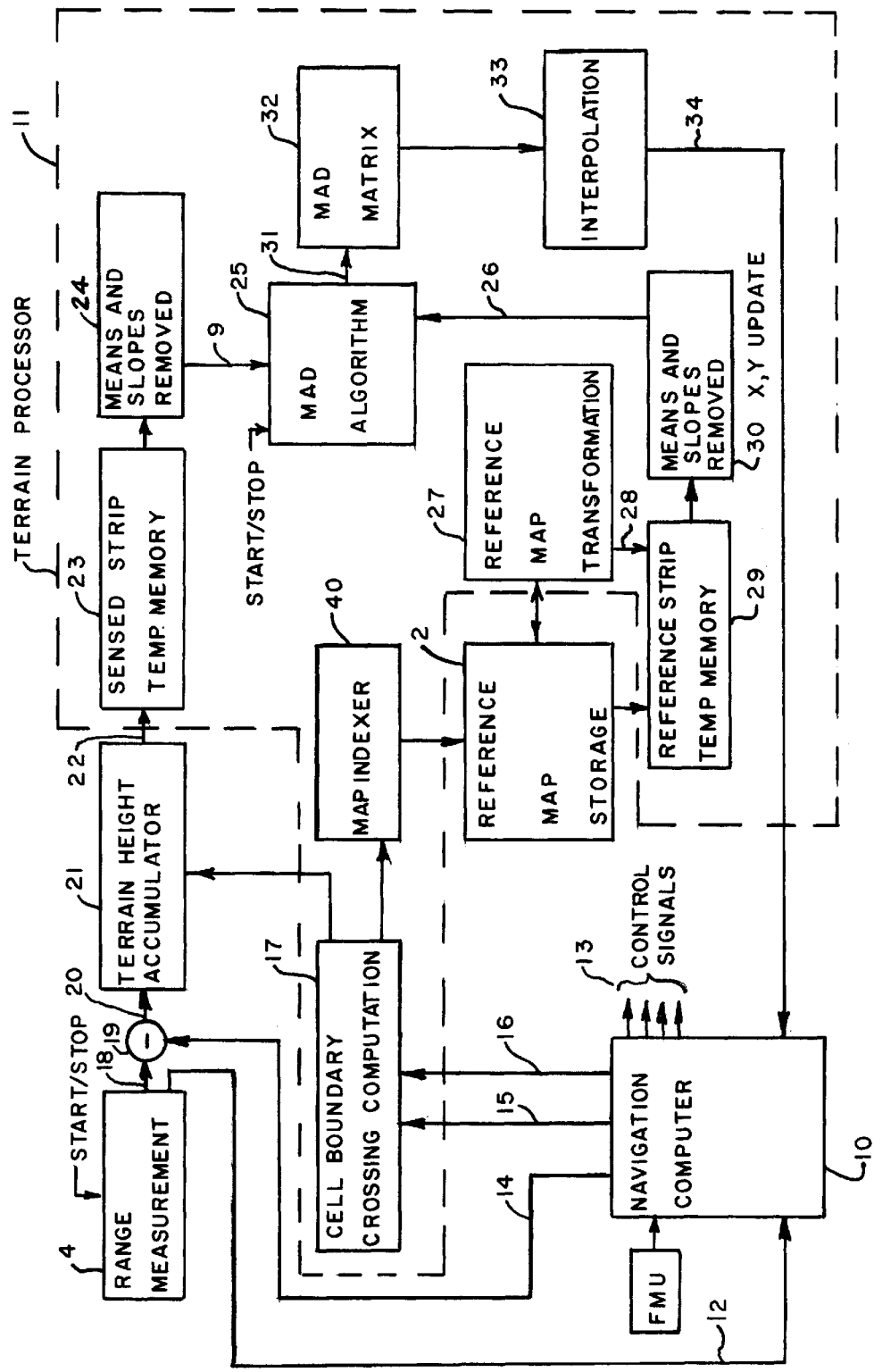
FIG. 5 is a block diagrammatic view of one illustrative embodiment of guidance system of this invention.

Referring now to FIG. 1, reference numeral 1 indicates a reference map also shown as $M_{Aij}$. The map 1 is a data map of terrain attitudes stored in a suitable memory device, indicated by the reference numeral 2 in FIG. 5. A second map, indicated by the reference numeral 3 and designated $M_{SU}$ in FIG. 1, is a set of contiguous radar measured altitudes, obtained from a suitable radar range measurement device 4. The device 4 is shown in FIG. 5. While a radar altitude measurement is employed in the preferred embodiment of this invention, those skilled in the art will recognize that other measurement techniques may be used, if desired.

It is known to use such reference data maps of terrain altitudes. For example, see U.S. Pat. No. 3,328,795. That patent teaches making numerical comparison of sampled and prerecorded data at high speed using a digital computer. As explained above, in the present invention such comparisons are performed for both dimensions of the data stored in the reference map to determine the best physical correlation of the sample with the reference map. The actual position of the vehicle or aircraft in which the radar range measurement device 4 is located is that position which has the best correlation.

As is well known, in computing such a correlation the length of the shorter of the two maps 1 and 3 must be equal to the length over which correlation is being attempted. This length is called the integration length of the process, and is equal to the number of cells (N) times the width of a cell (D). The longer map must be equal to the sum of the length of the uncertainty basket, indicated by the reference numeral 5, plus the integration length. The width of the reference map is set equal to the width of the uncertainty basket. It is known, see U.S. Pat. No. 4,144,571, as explained above that the position of the vehicle is not precisely known but rather falls within an area of uncertainty which applicants herein call an uncertainty basket. The process described in greater detail hereinafter provides a measure of the match between the radar samples and the stored reference and reaches a minimum value for the best match and is obtained from the formula $$MAD_{uj} = \frac{1}{N}\sum_{i=1}^{N} |M_{S_{u+i-1}} - M_{A_{ij}}|$$

where MAD=mean absolute difference function, $M_A$=reference map, $M_S$=sensed map data, N=number of cells in the MAD summation, D=cell size, and U=length of uncertainty basket. A similar correlation operation is described in U.S. Pat. No. 4,347,511.

Figure 2:
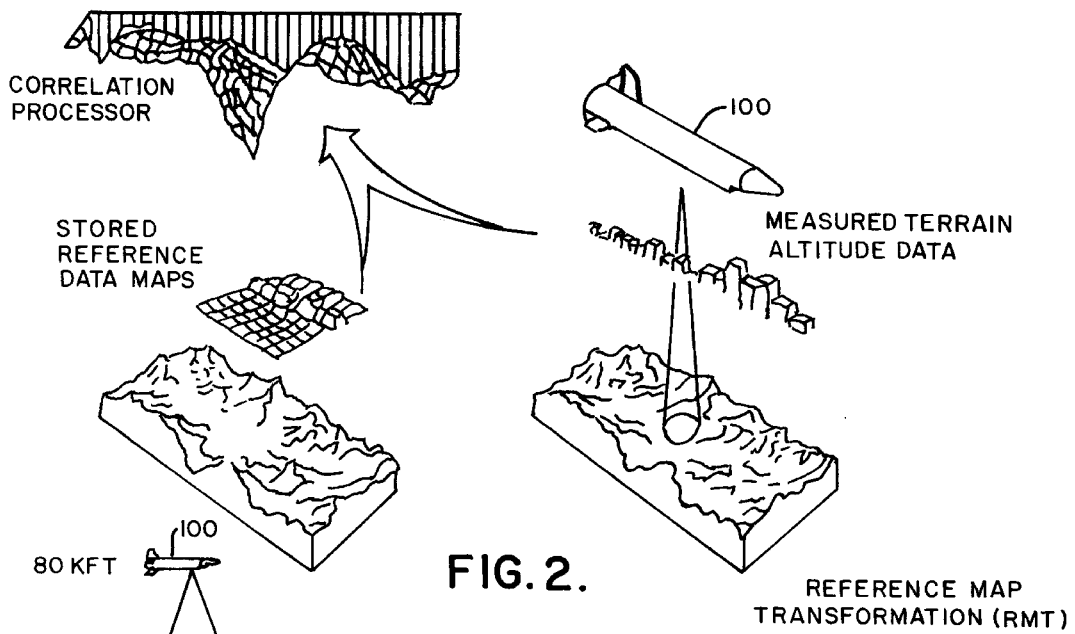
FIG. 2 is a pictorial representation of the terrain correlation process.

The pictorial representation of this process is shown in FIG. 2. That is to say, the measured terrain altitude data is compared to stored reference map data and the occurrence of a "match" between the data sets corresponds to a position fix for the vehicle. For example, the terrain altitude data previously obtained for an area of interest is stored in digital form (the height of the peaks on the portion of FIG. 2 labelled Stored Reference Data Maps representing the digital value of the terrain altitude at that point on the map). These stored values are compared with the Measured Terrain Altitude Data of FIG. 2. The position of the vehicle then corresponds to the lowest point of the output of the correlator, said output being labelled Correllation Processor. The procedure described above is known in the vehicle guidance art.

Figure 3:
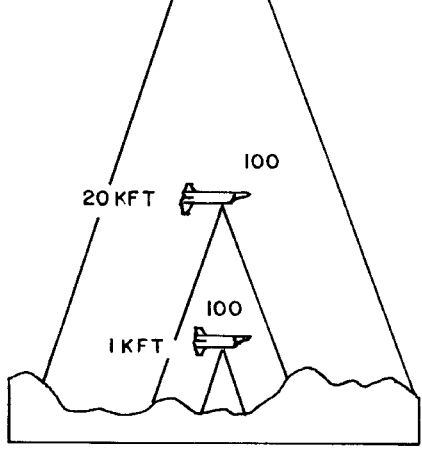
FIG. 3 is an pictorial illustration of the effect of altitude on a radar altimeter.
Figure 4:
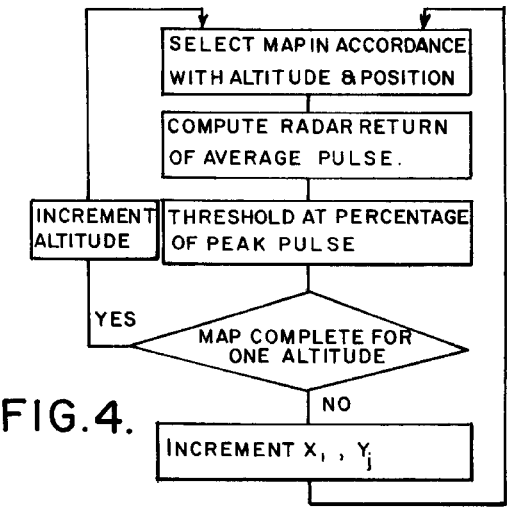
FIG. 4 is a flow chart illustrating the reference map transformation employed with the guidance system of this invention.

FIG. 3 illustrates problems encountered when the height of the vehicle in the form of a missile 100 is varied. When a radar altimeter operates under high altitude, the resulting measured terrain profile becomes a filtered or smooth version of the actual terrain profile. This result has been graphically demonstrated in FIG. 3 for illustrative purposes. With our invention, the terrain correlation is made independent of altitude by a reference map transformation. That is to say, reference map data is transformed to correlated reference data for comparison with measured actual data. The flow diagram for this process is shown in FIG. 4.

As noted above, the reference map transformation essentially is a simulation of the radar, antenna, terrain background scatter function and altimeter processing to give simulated values of the reference map based upon the height of the vehicle. That is, this transformation replaces the altitude values in the reference map with the value of altitude which the radar will actually measure, taking into account the factors just listed. The actual process of transforming the map is illustrated in FIG. 4. First, the reference map is selected in accordance with the altitude and position of the vehicle (see the block labelled 61 in FIG. 4). For that particular map, a simulated radar return of the average pulse is computed taking into account the factors listed above (block 63). A threshold at percentage of peak pulse for this simulated radar return is computed (block 65). Then if the transformed map has not been completed for that altitude, the x- and/or y-coordinates of the transformed map are incremented (block 67) and the process is repeated for this new coordinate of the transformed map. Once the transformed map is completed, the altitude can be incremented (block 69) before the computation of the next transformed map.

FIG. 5 illustrates a block diagrammatic view of a navigation system employing terrain correlation system of this invention. As there shown, an inertial navigation computer 10 is adapted to provide guidance information to a vehicle, which in the embodiment illustrated is a suitable missile 100, along a plurality of outputs later described in greater detail. The navigation computer 10 is adapted to receive update vehicle position from a terrain comparison processor 11, shown in dash lines in FIG. 5, and shown in more detail in FIG. 6.

Figure 6:
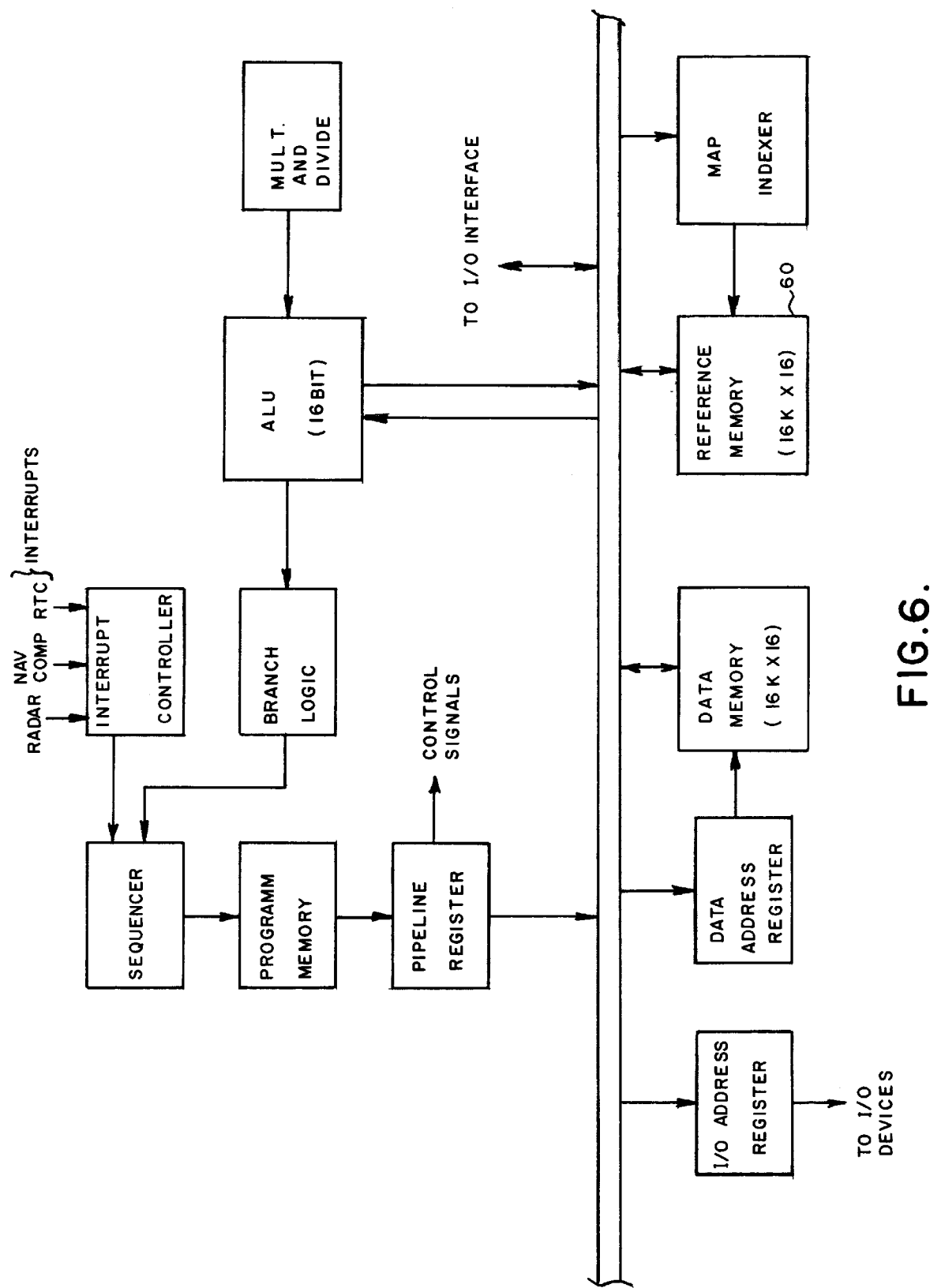
FIG. 6 is a block diagrammatic view of the processor unit shown in FIG. 5.

As indicated, the missile 100 is equipped with a suitable altimeter or range measurement means 4, and altitude information obtained from the altimeter or range measurement means 4 is an input to the computer 10 along input 12. The computer 10 provides a plurality of control signals to the missile 100 along outputs generally indicated by the reference numeral 13. The computer 10 also provides height information data along an output 14, and dead reckoning positions in the down path direction at an output 15 and cross path direction to a cell boundary crossing computation means 17 along an output 16. As is well known in the art, functions similar to the ones indicated in FIG. 5 can be implemented either in hardware or software or some combination thereof. See, for example, U.S. Pat. No. 4,179,693. An illustrative inplementation is shown in FIG. 6. The cell boundary crossing computation means 17 determines when one cell is dropped to maintain a constant length for a new correlation. That is to say, to provide update information, a terrain correlation processor uses radar to sense the altitude contour of the terrain over which it is flying. The path taken is quantized into fixed size square areas called cells by representing each cell with a value equal to the average of all the radar altitudes obtained in that cell. The resulting sensed map will then be one cell wide by N cells long. Once enough cells are known, the terrain contour processor compares the sensed terrain map with a reference map normally stored in its memory. The reference map consists of average altitude cells the same size as those of the sensed map. As each additional cell is added to the end of the sensed map, the leading cell is dropped to maintain a constant length and to signal the start of a new correlation. The cell boundary crossing computation means 17 determines when to initiate the next correlation. As further described hereinafter, the boundary crossing computation means 17 also monitors curvilinear flight paths.

An output 18 of the range measurement means 4 is an input to a summing means 19. The height from the navigation computer 10 also is an input to the summer 19 along the output 14, so that an operation similar to the subtraction shown in FIG. 1 of U.S. Pat. No. 4,144,571 can be performed. An output 20 of the summing means 19 is an input to a terrain height accumulator 21. An output 22 of the terrain height accumulator 21 is an input to a temporary memory means 23 of the terrain comparison processor 11. This is where the sensed strip or map $M_{SU}$ is stored for the correlation process. An output of the temporary memory means 23 is an input to a means and slope removal means 24, since as discussed above the algorithm described herein works on sampled values with the means removed. That is to say, the sensed path is quantized into fixed square areas or cells by representing each cell with a value equal to the average of all of the altitudes sensed for that cell. The means and slopes removed block 24 provides the required value for algorithm operation. An output of the slope removal means 24 is an input at 9 to a mean absolute difference (MAD) algorithm calculation means 25, which like the other components described herein can be implemented in hardware or software. The mean absolute differential algorithm calculation means 25 solves the mean absolute difference function formula set forth above.

The other input to the mean absolute difference algorithm calculation means 25 is reference data values along an input 26, which values are acquired as follows:

The reference map storage means 2 stores data for the reference map. In the embodiment illustrated, the reference map storage data forms an input to a reference map transformation means 27 which performs the map transformation, the operational process of which is shown in FIG. 4 and is discussed in connection therewith. This transformation changes the reference map values to correspond to those values the radar altimeter will actually see at the sensed altitude. As will be appreciated by those skilled in the art, the reference map is a radar image of the actual terrain being overflown. The reference map transformation occurring in reference map transformation means 27 is a processing of the actual terrain map altitudes of the sensed map. The transformation or simulation replaces each altitude value in the original terrain map with the value of altitude which the actual radar will measure. As can be observed in FIG. 3, the reference altitude and the actual altitude being measured during flight will vary depending upon the vehicle height. By replacing the altitude value of the reference map with a simulated altitude value, significantly better correlation of missile position is obtainable. In addition, means and slopes removed block 30 by operating on the simulated altitude value provides the required value for algorithm operation. An output 28 of the transformation means 27 is an input to a reference strip temporary memory means 29, which stores that portion of the transformed map needed of the correlation. An output of the reference strip temporary memory means 29 is an input to a means and slope removal means 30, which performs the same function for the map data as means 24 does for the sensed data. As indicated above, the output 26 of the means and slope removal means 30 is a second input to the algorithm calculation means 25. An output 31 of the calculation means 25 gives one point to a matrix means 32. As is known, the output of such a correlation is a matrix of values, one for each map point in the uncertainty basket. Matrix means 32 stores the values thus obtained. The process for establishing points for the matrix means 32 is repeated until the down-track uncertainty basket has been eliminated, i.e., the matrix has been completely computed, providing a two-dimensional mean absolute difference matrix over the entire uncertainty basket. In the event there is a perfect match, each difference between the sensed and the calculated altitude is zero, and the sum of the N sample is zero, so that the value of the mean absolute difference matrix at that point is zero. As previously indicated, because of various sources of error a perfect zero is never obtained. The minimum of the mean absolute difference matrix, however, provides an accurate indication of the location of the vehicle. This location is determined in an interpolation means 33, which merely locates the minimum value in the matrix, and a suitable XY update signal is provided at an output 34 to the computer 10.

Curvilinear flight paths are monitored through the use of the cell boundary crossing computation means 17, as described below.

The mean absolute difference algorithm used to determine the aircraft's position with respect to the reference map is shown below for a simplified case where it is assumed that only one sensed map will be correlated over the map.

$$CS_J = \sum_{N=1}^{NROWS} |S_N - R_{N,J}|,$$

where NROWS=number of ROWS in the reference map, $S_N$=Nth sensed map cell value, $R_{N,J}$=reference map cell value in row N, column J of the reference map, and $CS_J$=correlation sum for sensed map positioned over Jth column of reference map.

In the above equation, J will be a constant when the sensed map is a straight strip of cells, as illustrated in FIG. 1, since this implies the missile never crosses over from one column of the reference map to another. By storing the cell values of the reference map consecutively in the reference map storage memory 2, the memory need only be incremented to obtain the desired reference map cell value. For curvilinear paths, however, J is no longer a constant and therefore the desired reference cell values cannot be obtained by mere incrementation. The desired referenced cell value now can be one of eight possible values, which are the values of the reference cells surrounding the current position in the reference map. Thus, the reference memory is incremented by a proper correlation loop to move one cell in any direction in the map using the following technique. It should be appreciated that the reference map storage stores many more map cells than are needed for any single correlation.

Figure 7:
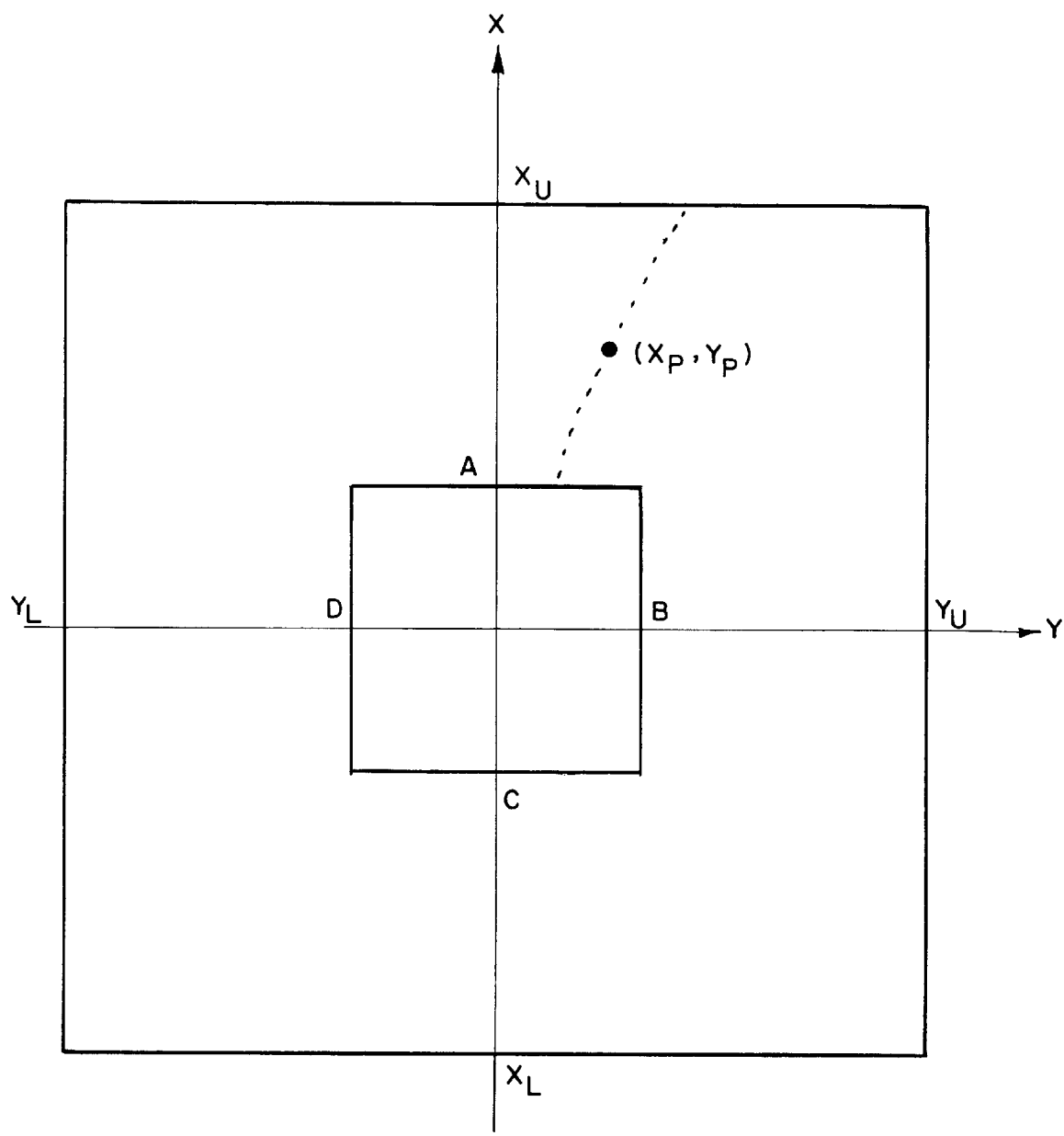
FIG. 7 is a diagrammatic view of the coordinate system used for generating a sensed map in the terrain correlation system of this invention.

The vehicle path is determined in the coordinate system shown in FIG. 7 by integrating the x-coordinate (input 15) and y-coordinate (input 16) velocities from the navigation computer in the cell boundary crossing computation 17. The four starting points for the integration are shown in FIG. 7 as A, B, C and D. If the x velocity is greater than the y velocity, the starting point is A or C, depending on whether the x velocity is positive or negative, respectively. If the y velocity is greatest, the starting point is B or D, depending on whether the y velocity is positive or negative, respectively. The flight path is traced until one of the thresholds $X_u$, $X_L$, $Y_u$ or $Y_L$ is crossed. An example of the path across one particular cell is illustrated in the figure. The center of the flight path $(X_p, Y_p)$ between the last two threshold crossings is used to determine the x and y displacement of the new cell with respect to the past cell. A unit displacement occurs if the center of the path is displaced from the center of the previous cell by more than half a cell width. The displacement is either +1, −1, or 0 depending on whether there is a positive movement, negative movement or no movement at all. The movements are stored in the map indexer 40. After each cell is sensed, the coordinate system of FIG. 7 is shifted so that it is centered on the past cell. Block diagrammatic views of processor 11 and MAP INDEXER 40 are shown in FIG. 6, but are not described in detail. A detailed description is believed to be repetitive in view of the description given above with respect to FIGS. 5 and 7.

FIG. 6 shows in block form the processor 11 and map indexer 40. The embodiment it illustrates includes a sixteen bit arithmetic logic unit (ALU) 71 connected to a dedicated multiply and divide circuit 73. ALU 71 performs the correlation of the sensed data with the transformed reference map data under the control of a program memory 75. Since the ALU can also be used for other functions, branch logic 77, a sequencer 79, and a pipeline register 81 are also provided.

An interrupt controller 83 having interrupt inputs from the radar altimeter, the navigational computer, and any other desired interrupts such as that labelled RTC is connected to the sequencer to initiate the proper sequence of operations depending upon the particular interrupt. Pipeline register 81 is connected to a system bus 85 which is also connected to an I/O (input/output) address register 87, a data address register 89 for addressing the sensed attitude data in strip data memory 23, and strip reference memory 29 which temporarily stores the reference map data. Map indexer 40 is also connected to system bus 85. As is well known, the program memory has stored therein the programs for the particular functions which the arithmetic logic unit is to perform, as selected by the interrupt controller. Those functions are the ones described above in connection with FIG. 5. Map indexer 40 functions to toggle a new reference map from the reference map storage 2, upon the occurrence of the missile crossing a cell boundary as determined by the cell boundary computation means 17.

It thus is apparent that a navigation system meeting all the ends and objects herein set forth above has been provided.

Numerous variations, within the scope of the appended claims, will be apparent to those skilled in the art in light of the foregoing description and accompanying drawings. Thus, while single line schematic connections have been employed in the drawings, those skilled in the art will recognize that the single line representation may comprise multiple connectors in hard wire embodiments of this invention. While the invention has been described with particular reference to its adaptability with missile control functions, the invention has applicability in a number of other vehicles. As indicated, the embodiment described employs a radar altimeter. Other altitude measurement devices are compatible with the broader aspects of our invention. These variations are merely illustrative.

Having thus described the invention, what is claimed and desired to be secured by Letters Patent is:

1. In a navigation system for a vehicle including a navigation computer for generating a predetermined course, means for determining the distance of the vehicle from the terrain of which it is traversing, said distance determining means comprising radar means for directing radiation toward the terrain and for receiving a radar return back from the terrain, and means for storing at least one reference map in data form corresponding to the terrain over which the predetermined course is to traverse, the improvement comprising means for transforming the reference map data to simulated data based on at least a known distance of the vehicle from the terrain over which the vehicle is traveling and on simulated radar returns from the terrain at said known distance, means for comparing the simulated data to data representative of the actual distance from said terrain, and means for determining the position of said vehicle with respect to said map based on said comparison.

2. The improvement of claim 1 wherein said vehicle is a missile, and said means for determining the position of said vehicle with respect to said map based on said comparison further includes means for generating an error signal based on said position for use by said navigation computer.

3. A navigation system for a vehicle comprising:
 a navigational computer for generating a course command signal for said vehicle;
 means for determining the distance of the vehicle from the terrain over which it is traveling;
 means for storing at least one reference map in data form corresponding to the course over which the vehicle is traveling;

said storing means including means for storing at least reference maps portions that are to the right, to the left, or straight with respect to a previous reference map;

means for determining the present position of the vehicle with respect to said reference map;

means for determining whether the present position of the vehicle is one left, right or straight with respect to the immediately preceding position; and means for electronically selecting map data based on said determination to be used in determining the next position of the vehicle.

4. The navigation system of claim 3, wherein the distance determining means comprises radar means for directing radiation toward the terrain and for receiving radar returns back from the terrain, and said means for determining the present position further includes means for transforming the reference map data to simulated data based on at least a known distance of the vehicle from the terrain over which the vehicle is traveling and on simulated radar returns from the terrain at said known distance.

5. The navigation system of claim 4 wherein said means for determining the present position further includes means for comparing the simulated data to data representing the actual distance from the terrain over which said vehicle is traversing.

6. The navigation system of claim 5 wherein said vehicle is a missile, and said means for determining the position of said vehicle with respect to said map based on said comparison further includes means for generating an error signal based on said position for use by said navigational computer.

7. A navigation system for a vehicle, comprising:

a navigational computer for generating a course command signal for said vehicle;

means for determining the distance of the vehicle from the terrain over which it is traveling, comprising radar means for directing radiation toward the terrain and receiving radar returns back from the terrain;

means for storing at least one reference map in data form corresponding to the terrain over which the vehicle is to traverse;

means for transforming the reference map data to simulated map data based on at least a known distance of the vehicle from the terrain over which the vehicle is traveling and on simulated radar returns from the terrain at said known distance; and comparing and determining means for comparing the simulated data to data representing the actual distance from said terrain.

8. The navigation system of claim 7 further including means for determining whether the present position of said vehicle is one to the left, right or inline with respect to the immediately preceding position; and means for selecting map data based on said last mentioned determination to be used in determining the next position of the vehicle.

9. The navigation system of claim 8 wherein said vehicle is a missile, and said comparing and determining means further includes means for generating an error signal based on the determined position for use by said navigational computer.

10. A control system comprising:

a navigational computer for generating a course command;

means for storing a reference map in data form corresponding to the course over which the navigational computer is monitoring, including means for storing reference map data that is left, right or in line with respect to the present monitored position;

means for determining whether the present monitored position is one left, right or inline with respect to the immediately preceding monitored position; and means for selecting a succeeding map, the next map data reference being based on said determination.

11. The control system of claim 10 adapted for use in vehicle guidance, further including means for determining the distance of the vehicle from the terrain over which the vehicle is traversing, said distance determining means comprising radar means for directing radiation toward the terrain and for receiving radar returns back from the terrain; and said means for determining the position being monitored comprising means for transforming the reference map data to simulated data based on at least a known mean distance of the vehicle from the terrain over which the vehicle is traveling and on simulated radar returns from the terrain at said known mean distance, said means for determining the position of said vehicle based on said comparison comprising means for comparing the simulated data to data representing the actual distance of said vehicle from said terrain.

12. The improvement of claim 11 wherein said vehicle is a missile, and said means for determining the position of said vehicle with respect to said map based on said comparison further includes means for generating an error signal based on said determined position for use by said navigational computer.

13. A navigational system for a vehicle, comprising:

a navigational computer for generating a course signal for said vehicle;

means for determining the distance of the vehicle from the terrain over which it is traveling, comprising radar means for directing radiation toward the terrain and for receiving radar returns back from the terrain;

means for storing a reference map in data form corresponding to the course over which the vehicle is traveling;

means for transforming the selected reference map data to simulated data based on at least a known distance of the vehicle from the terrain over which the vehicle is traveling and on simulated radar returns from the terrain at said known distance;

means for comparing the simulated data to data representing the actual distance from said terrain;

means for determining the present position of said vehicle with respect to said map based on said comparison:

means for determining whether the present position of the vehicle is one left, right or inline with respect to the immediately preceding position; and means for selecting map data based on said last mentioned determination to be used in determining the next position of the vehicle.

14. The control system of claim 13 wherein said vehicle is a missile, and said means for determining the position of said vehicle with respect to said map based on said comparison further includes means for generating an error signal based on said position for use by said navigational computer.

* * * * *